D. E. LYONS.
ROLLER BEARING.
APPLICATION FILED DEC. 30, 1911.
1,051,142.
Patented Jan. 21, 1913.
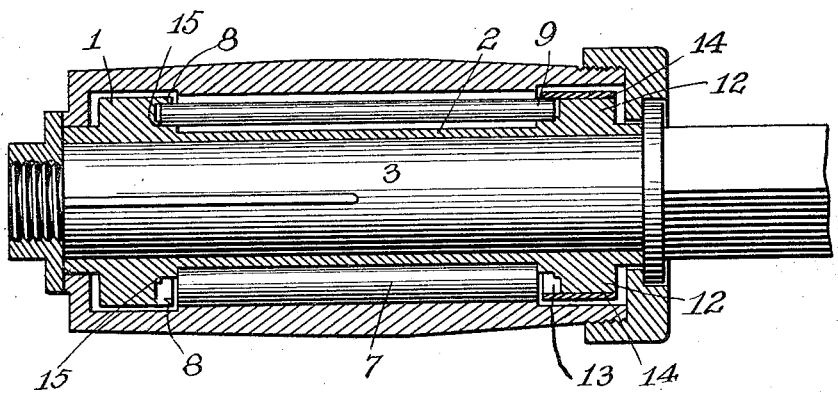
WITNESSES:
J. Herbert Bradley.
Thomas Joyce
INVENTOR
David E. Lyons
by Darwin S. Wolcott Atty

UNITED STATES PATENT OFFICE.

DAVID E. LYONS, OF LOS ANGELES, CALIFORNIA, ASSIGNOR TO DARWIN S. WOLCOTT, TRUSTEE, OF SEWICKLEY, PENNSYLVANIA.

ROLLER-BEARING.

1,051,142.   Specification of Letters Patent.   Patented Jan. 21, 1913.

Application filed December 30, 1911. Serial No. 668,746.

*To all whom it may concern:*

Be it known that I, DAVID E. LYONS, residing at Los Angeles, in the county of Los Angeles and State of California, a citizen of the United States, have invented or discovered certain new and useful Improvements in Roller-Bearings, of which improvements the following is a specification.

The invention described herein relates to certain improvements in roller bearings of the type having bearings or working rollers mounted so as to roll around a suitable bearing surface and suitably spaced by idlers of less diameter than the working rollers and supported with their axes the same distance as the axes of the working rollers from the axes of the bearing.

The invention is hereinafter more fully described and claimed.

In the accompanying drawing forming a part of this specification is shown a sectional elevation of my improved bearing.

In the practice of my invention the bearing member 2, which is preferably the outer surface of a hollow cylinder or sleeve adapted to be secured in any suitable manner on a shaft axle or other supporting member 3 is provided with spaced collars 1 and 12 between which the working rollers are arranged. These collars are made of such a thickness or height relative to the bearing surface 2, as to permit of the formation of grooves or raceways 4 in their inner ends for the reception of the ends of spacing rollers 5. The grooves or raceways are formed such a distance from the bearing surface 2, that shoulders or abutments 6 are formed which will afford bearings for the ends of the working rollers, which rest upon the bearing surfaces. As the lower walls of the raceways are employed for supporting the spacing rollers, the heights of the shoulders from the bearing surface are so proportioned relative to the diameter of the spacing rollers, said diameters being less than that of the working rollers, that the spacing rollers will be supported out of contact with the bearing surface 2 and will also be concentric with the working rollers, *i. e.*, the axes of the two series of rollers will be equidistant from the bearing surface. In such a construction the area of the shoulders or abutments in contact with the ends of the working rollers will be less than half the areas of the ends of such rollers. This is an important feature of my improved bearing as experience shows that when the bearing areas of these two elements are relatively large and undesirable heating is liable to occur. It will be observed that the upper walls of the raceway are cut back, so that the ends of the rollers will not contact therewith. The flanges 8 which form the upper wall of the groove or raceway serve as retaining rings for the spacing rollers and extend over the ends of such rollers sufficiently far to prevent a dislodgment of these rollers but not sufficiently far to contact with the ends of the working rollers or the ends of the bodies of the spacing rollers, when the latter are formed with reduced journal portions 9, as shown.

As the distance between the inner ends of the upper walls of the raceways is less than the lengths of the spacing rollers, one of such walls should be made removable to permit of the placing of the spacing rollers in position. In the construction shown, the upper wall of the raceway in the collar 12 is formed by the inner end of a ring 14, which is held in position in the collar in any suitable manner, as by the threads, or it may be shrunk on or forced to proper position by a suitable press. The inner end of this ring forms, as stated the upper wall of the raceway 13 and serves to retain the ends of the spacing rollers in position.

When the ends or journal portions of the spacing rollers have the same diameter as the body portions, shoulders 15 are formed in the raceways of a height less than the diameters of the spacing rolls, so that while they perform their function of preventing endwise movement of the spacing rollers, the areas of contact of the rollers and shoulders will not be sufficient to cause frictional heating.

I claim herein as my invention:

A roller bearing consisting of working rollers and intermediate spacing rollers in combination with a member having a cylindrical bearing surface and provided with peripheral bearings for the spacing rollers, and with end bearings for the working rollers adjacent to the bearing surface, said bearings being not greater than half the diameter of the working rollers and with retaining rings extending inwardly over the ends of the spacing rollers but not into contact with the ends of the working rollers, thereby avoiding an increase of the end bearing of the working rollers beyond half the areas of the same, said parts for one end of the rollers being integral with the bearing surface while the retaining ring for the opposite ends of the rollers is removable to permit of the placing of the spacing rollers in position.

In testimony whereof, I have hereunto set my hand.

DAVID E. LYONS.

Witnesses:
G. G. TRILL,
ALICE A. TRILL.

Copies of this patent may be obtained for five cents each, by addressing the "Commissioner of Patents, Washington, D. C."